(12) United States Patent
Okamoto et al.

(10) Patent No.: US 11,611,671 B2
(45) Date of Patent: Mar. 21, 2023

(54) IMAGE READING DEVICE HAVING OPENABLE AUTO DOCUMENT FEEDER AND IMAGE FORMING APPARATUS PROVIDED THEREWITH

(71) Applicant: Brother Kogyo Kabushiki Kaisha, Nagoya (JP)

(72) Inventors: Yoshihiro Okamoto, Komaki (JP); Takashi Fujiwara, Nagakute (JP); Tomoyuki Mizuno, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/074,753

(22) Filed: Oct. 20, 2020

(65) Prior Publication Data
US 2021/0120137 A1  Apr. 22, 2021

(30) Foreign Application Priority Data

Oct. 21, 2019  (JP) .............................. JP2019-192140

(51) Int. Cl.
*H04N 1/00* (2006.01)
*H04N 1/12* (2006.01)

(52) U.S. Cl.
CPC ....... *H04N 1/00604* (2013.01); *H04N 1/0071* (2013.01); *H04N 1/00689* (2013.01); *H04N 1/00694* (2013.01); *H04N 1/12* (2013.01)

(58) Field of Classification Search
None
See application file for complete search history.

(56) References Cited

U.S. PATENT DOCUMENTS

| 2010/0091315 | A1* | 4/2010 | Shiraki | H04N 1/00631 |
| | | | | 358/1.13 |
| 2017/0230523 | A1* | 8/2017 | Nakajima | H04N 1/00827 |
| 2018/0103173 | A1* | 4/2018 | Ogasawara | H04N 1/121 |
| 2019/0367315 | A1* | 12/2019 | Fujii | H04N 1/00588 |
| 2020/0153977 | A1* | 5/2020 | Ogawa | G06F 3/1256 |
| 2020/0278632 | A1* | 9/2020 | Mori | G03G 15/6552 |
| 2020/0285188 | A1* | 9/2020 | Okamoto | G03G 21/1619 |
| 2020/0288028 | A1* | 9/2020 | Hayakawa | H04N 1/00315 |
| 2020/0382674 | A1* | 12/2020 | Matsumoto | H04N 1/00554 |
| 2021/0021725 | A1* | 1/2021 | Kurimoto | H04N 1/00604 |

FOREIGN PATENT DOCUMENTS

JP  2012-248976 A  12/2012

* cited by examiner

*Primary Examiner* — Miya J Williams
*Assistant Examiner* — Miya J Cato
(74) *Attorney, Agent, or Firm* — Banner & Witcoff, Ltd.

(57) ABSTRACT

An image reading device installed in an image forming apparatus includes a document placing table having an image reader, and an auto document feeder (ADF) rotatably supported by the document placing table. The ADF is rotatable between a closed position where an upper surface of the document placing table is uncovered and an opened position where the upper surface is covered. The ADF includes a document tray, a document discharge tray arranged at a position below the document tray with a space, and a front wall fixed to a front side of the document tray. A cutout part is formed on the front wall with a front side of the space being opened through the cutout part. The ADF further includes a hand grip provided to an upper edge of the cutout part, and used to lift the ADF from the closed position toward the opened position.

19 Claims, 7 Drawing Sheets

IMAGE READING DEVICE HAVING OPENABLE AUTO DOCUMENT FEEDER AND IMAGE FORMING APPARATUS PROVIDED THEREWITH

CROSS-REFERENCE TO RELATED APPLICATIONS

This application claims priority under 35 U.S.C. § 119 from Japanese Patent Application No. 2019-192140 filed on Oct. 21, 2019. The entire subject matter of the application is incorporated herein by reference.

BACKGROUND

Technical Field

The present disclosures relate to an image reading device and an image forming apparatus employing such an image reading device.

There have been known an image reading device provided with an auto document feeder (ADF) and an image forming apparatus (e.g., a copying machine, a printer) employing such an image reading device. In a conventional technique, there is known a configuration in which the ADF is configured to cover/uncover an upper surface of a document placing table, and a grip to be held by a hand of a user is provided to a front surface of the ADF. According to such a configuration, it becomes possible to open/close the ADF with respect to the document placing table easily with preventing fingers from being pinched between the document placing table and the ADF.

SUMMARY

In the conventional configuration mentioned above, since a big grip is provided to protrude from the front surface of the ADF, the apparatus becomes upsized.

According to aspects of the present disclosures, there is provided an image reading device comprising a document placing table including an image reader configured to read an image of a document sheet placed on the document placing table, and an auto document feeder rotatably supported by the document placing table such that the auto document feeder is rotatable between a closed position and an opened position, the auto document feeder covering an upper surface of the document placing table when located at the closed position, the auto document feeder uncovering the upper surface of the document placing table when located at the opened position. The auto document feeder includes a first tray which is one of a document tray and a document discharge tray, the document tray being configured to support one of the document sheet before the image is read by the image reader, the document discharge tray being configured to support the document sheet after the image is read by the image reader, a second tray arranged below the first tray with a space between the first tray and the second tray, the second tray being the other of the document tray and the document discharge tray, a conveyer configured to convey the document sheet from the document tray toward the document discharge tray, a front wall arranged on a front side with respect to the first tray, the front wall being formed with a cutout through which a front part of the space is opened along a width direction perpendicular to both an up-down direction and a front-rear direction, and a hand grip arranged on an upper periphery of the cutout part of the front wall, the hand grip being gripped by a user and lifted when the auto document feeder is rotated from the closed position toward the opened position.

DETAILED DESCRIPTION OF THE EMBODIMENT

Figure 1:
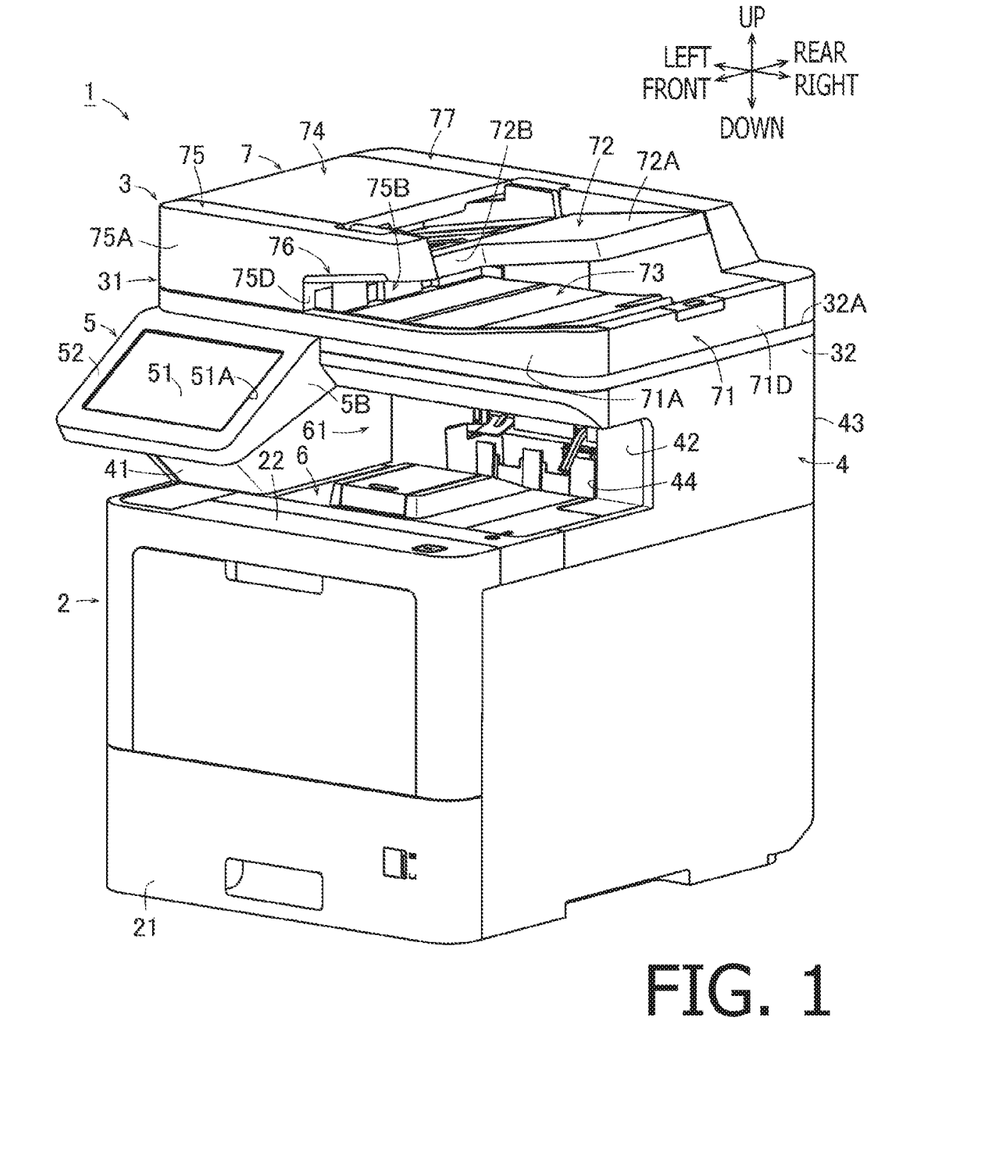
FIG. 1 is a perspective view of an image forming apparatus according to the present disclosures when an ADF being located at a closed position.

Hereinafter, an illustrative embodiment of an image forming apparatus 1 will be described. Referring to FIG. 1, directions of the image forming apparatus 1 which is placed for use will be defined. A front side of the image forming apparatus 1 is a side on which a front wall 75 is provided, a rear side of the image forming apparatus 1 is a side opposite to the front side. Right and Left directions of the image forming apparatus 1 are defined as a right-hand side and a left-hand side, respectively, when the image forming apparatus 1 is viewed from the front side. An upper side and a lower side of the image forming apparatus 1 are side where a second housing 3 and a first housing 2 are arranged, respectively. In the following description, a direction extending in the right and left sides will be referred to as a right-left direction, a direction extending in the front and rear sides will be referred to as a front-rear direction, and a direction extending in the upper and lower direction will be referred to as an up-down direction. Further, the right-left direction is a width direction which is perpendicular to both the front-rear direction and the up-down direction.

Configuration of Image Forming Apparatus

The image forming apparatus 1 is a so-called in-body discharging type apparatus. The image forming apparatus 1 includes the first housing 2, the second housing 3, a leg part 4 and an operation panel 5. The first housing 1 is an example of a main body.

The first housing 2 accommodates a sheet tray 21 configured to support sheets on which no images are formed, a well-known conveying mechanism configured to convey the sheet from the sheet tray 21, a well-known image forming part configured to form an image on the sheet conveyed by the conveying mechanism, and a well-known discharging mechanism configured to covey the sheet from the image forming part to an outside of the first housing 2.

The sheet tray 21 is configured to be slidably movable between an accommodated position where the sheet tray 21 is accommodated in the first housing 2 (a position shown in FIG. 1) and a drawn position where the sheet tray 21 is drawn frontward from the first housing 2. A configuration of the image forming part is not necessarily be limited to a particular configuration but any suitable method such as an electrophotographic method, an inkjet method or a thermal method may be employed.

On an upper surface of the first housing 2, a sheet discharge tray 6 configured to support the sheets discharged by the discharging mechanism is formed. The sheet tray 6 is formed on the upper surface 22 of the first housing 2 such that a surface, on which the sheets are discharged, inclines upwardly from the rear side toward the front side with curving convexly.

The second housing 3 is provided above an upper side with respect to the first housing 2 and includes an image reading device 31. The image reading device 31 has a document placing table 32 accommodating an image reader (not shown) configured to read an image of a document sheet (e.g., an original sheet) placed on an upper surface 32A thereof. The image reading device 31 includes an auto document feeder (hereinafter, referred to as an "ADF") 7 arranged above the document placing table 32. The ADF 7 is rotatably supported by hinges which having rotation shafts extending in the right-left direction and provided to a read end of the ADF 7 so as to be rotatable about the rotation shafts. The ADF 7 is rotatable between a closed position where the ADF 7 covers the upper surface 32A of the document placing table 32 and an opened position where the ADF 7 uncovers the upper surface 32A.

A leg part 4 includes a left leg 41, a right leg 42 and a rear leg 43. The left leg 41, the right leg 42 and the rear leg 43 are arranged on the upper surface of the first housing 2 at a left end part, a right end part and a rear end part thereof, respectively, and are configured to support the second housing 3 in a lifted manner With this configuration, the second housing 3 is arranged at above the sheet discharge tray 6 with a discharge space 61 defined therebetween. Further, an opening 44 is defined, on a front side of the image forming apparatus 1, by the left leg 41, the right leg 42, an upper surface of the first housing 2 and a lower surface of the second housing 3. The discharge space 61 is exposed frontward though the opening 44. Accordingly, a user can take out the sheets discharged and stacked onto the sheet discharge tray 6 through the opening 44.

The operation panel 5 has a rectangular parallelepiped shape and is provided to the image forming apparatus 1 such that a left surface 5A of the operation panel 5 and a left surface 32D of the document placing table 32 are on the same plane and the operation panel 5 protrudes frontward from a front panel 32B of the document placing table 32. The operation panel 5 has a touch panel 51 enabling the user to operate the image forming part and the image reading part, and a vessel surrounding the touch panel 51.

Figure 5:
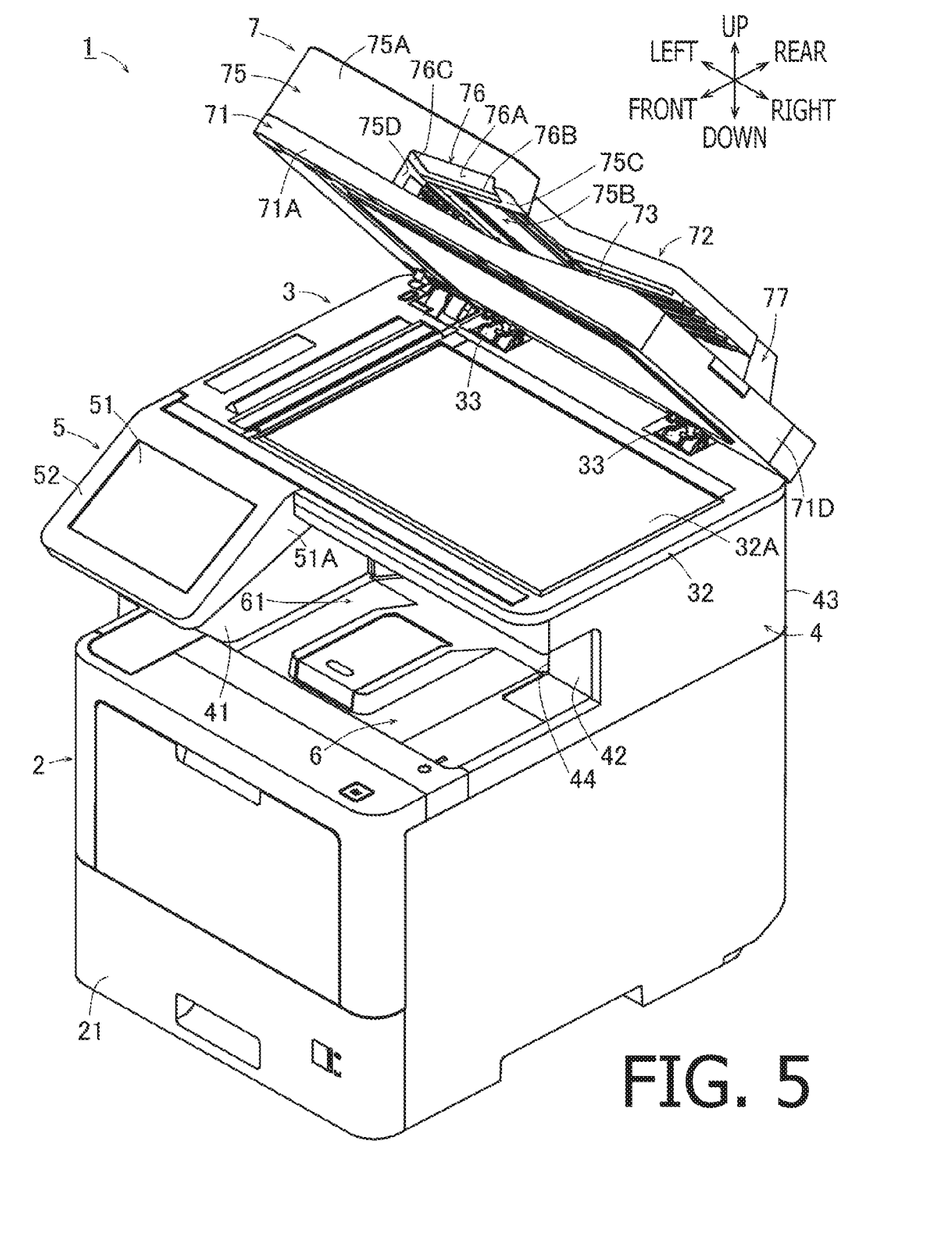
FIG. 5 is a perspective view of the image forming apparatus when the ADF is located at an opened position.

As shown in FIG. 5, the operation panel 5 and the sheet discharge tray 6 are arranged at different positions in the right-left direction when viewed from the front side. In the present embodiment, the operation panel 5 and the sheet discharge tray 6 are arranged such that a right end of the operation panel 5 and a left end of the sheet discharge tray 6 are on the same plane. According to this configuration, since the operation panel 5 does not hinder an operation of taking out the sheets from the sheet discharge tray 6 frontward, the user can take out the sheets from the sheet discharge tray 6 easily.

ADF

The ADF 7 includes a document cover 71, a document tray 72 as an example of a first tray, a document discharge tray 73 as an example of a second tray, a conveyer 74, a front wall 75, a hand grip 76, and a rear wall 77.

The document cover 71 is arranged at a lowest position of the ADF 7 and has a rectangular parallelepiped shape configured to cover the upper surface 32A of the document placing table 32 and press-hold a document sheet placed on the upper surface 32A. The document cover 71 is configured to have a size such that the document cover 71 substantially fully overlaps the document placing table 32 in a plan view. That is, a front surface 71A, a rear surface 71B, a left surface 71C and a right surface 71D of the document cover 71 and a front surface 32B, a rear surface 32C, a left surface 32D and a right surface 32E of the document placing table 32 are substantially on the same planes, respectively, when the document cover 71 is closed. With this configuration, no space for allowing a finger of the user is to be inserted is formed between the ADF 7 and the document placing table 32 when the ADF 7 is to be lifted up, it is possible to suppress a situation where the user's finger is pinched between the document placing table 32 and the ADF 7.

It is noted that the front surface 71A, the rear surface 71B, the left surface 71C and the right surface 71D of the document cover 71 may be arranged inward with respect to the planes of the front surface 32B, the rear surface 32C, the left surface 32D and the right surface 32E of the document placing table 32, respectively. In such a configuration, effects similar to those according to the above-described embodiment can be obtained. At least the front surface 71A among the surfaces 71A-71D of the document cover 71 may be arranged at the same plane as the front surface 32B of the document placing table 32 or inside of the front surface 32B of the document placing table 32.

The document tray 72 is arranged above the document cover 71, and is member configured to support the document sheet before scanning (i.e., before an image on the document sheet is read). The document tray 72 is rotatably supported such that a left end of a front end part is supported by the front wall 75 and a left end of a rear end part is supported by the rear wall 77. The document tray 72 is rotatable between a first position (i.e., a position indicated by solid lines in FIG. 2) where the document sheet can be conveyed and a second position (i.e., a position indicated by two-dot chain lines in FIG. 2) which is above the first position. When the document tray 72 is located in the second position, an upper part with respect to the document discharge tray 73 is opened, and it becomes easier for the user to take out the document sheets from the document discharge tray 73. It is noted that the document tray 72 may be configured to be not rotatable (i.e., fixed).

Figure 3:
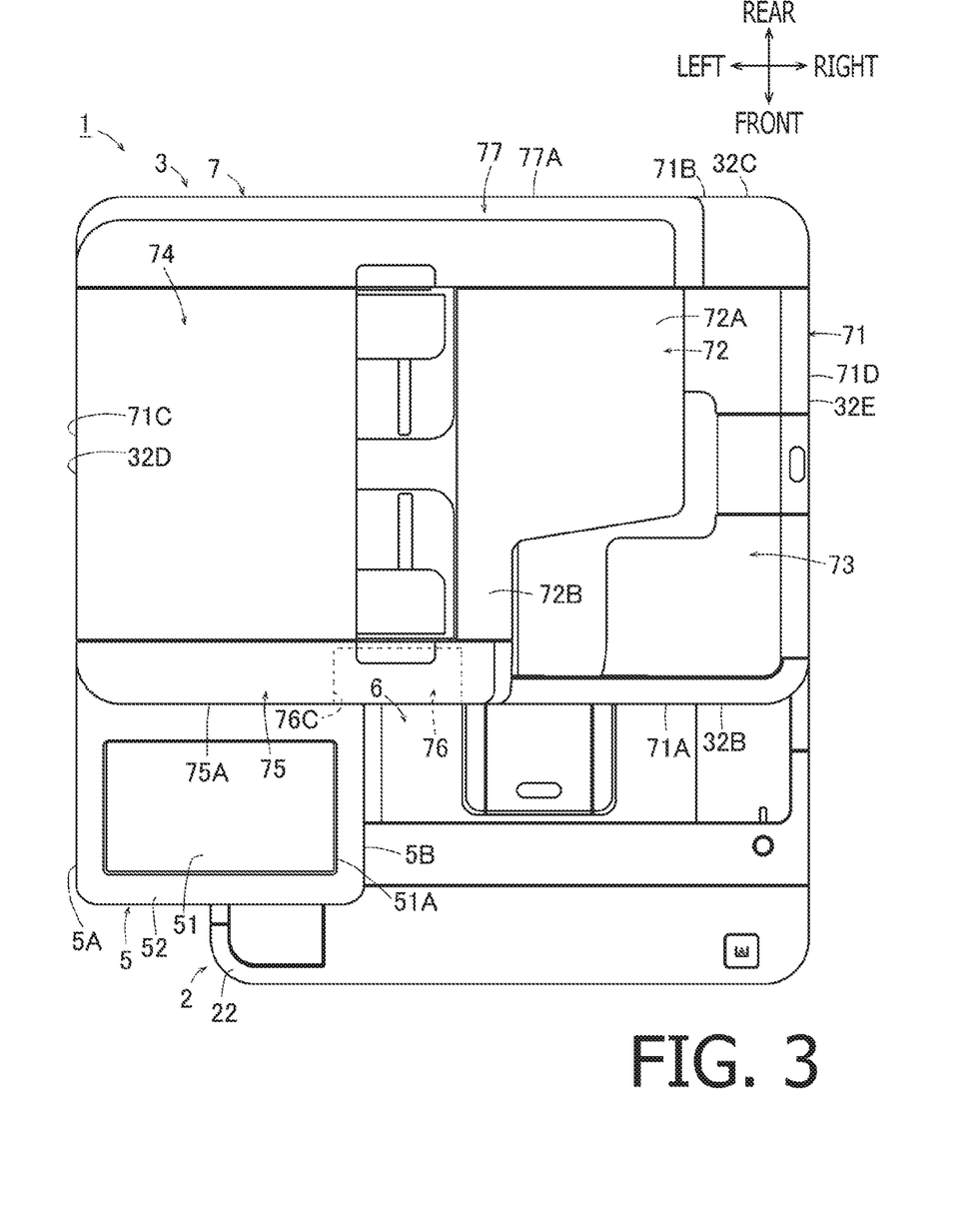
FIG. 3 is a plan view of the image forming apparatus.
Figure 4:
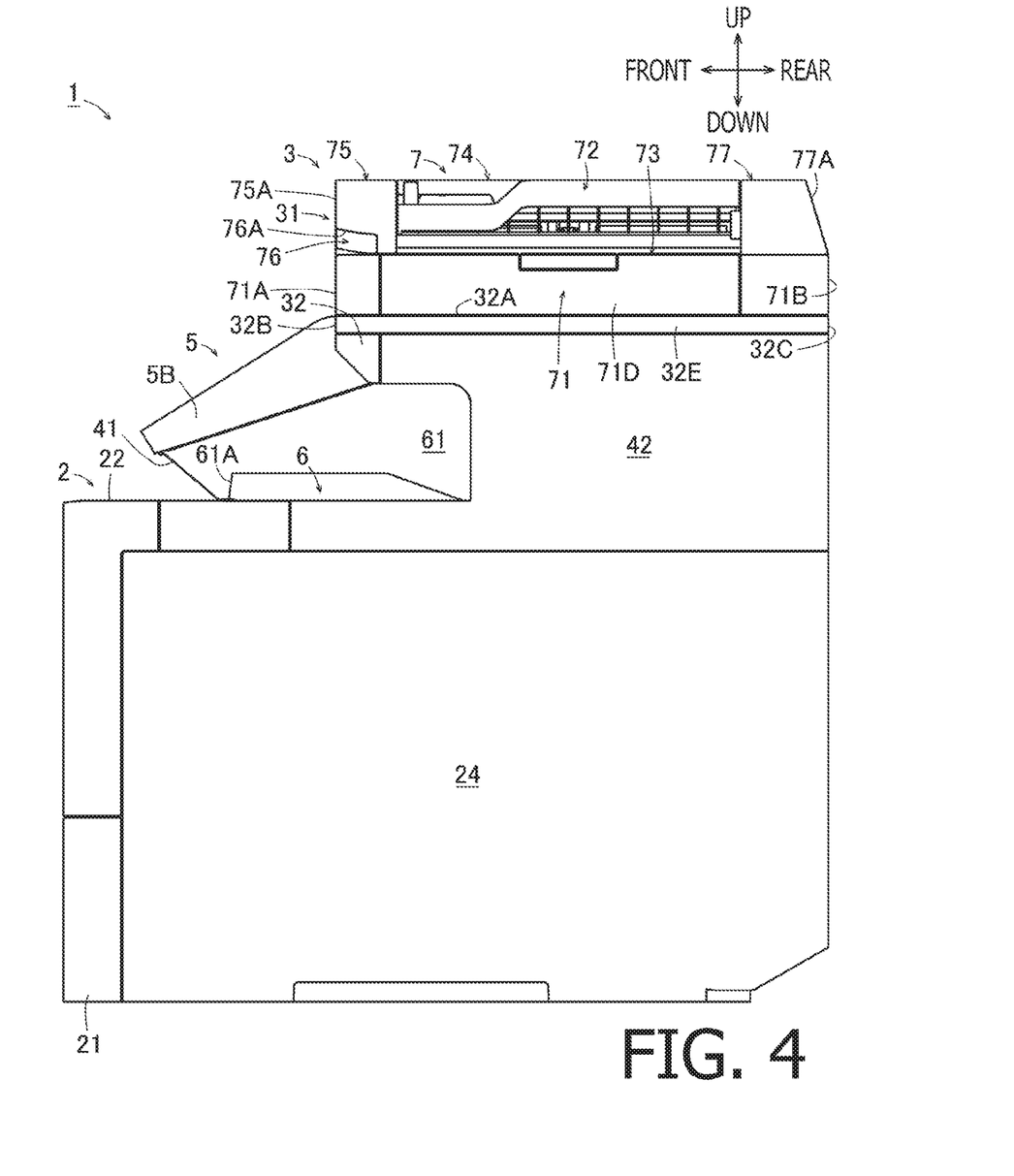
FIG. 4 is a right side view of the image forming apparatus.

As shown in FIG. 3, a right part 72A of the document tray 72, which does not overlap the front wall 75 when viewed from the front side, is arranged on the rear side with respect to a left part 72B which overlaps the front wall 75. That is, when viewed from the above, the document tray 72 has a shape such that a front-right part thereof is cut out. Therefore, when the user rotates the ADF 7, since the right part 72A of the document tray 72 is farther than the front wall 75, it is possible to suppress that the user from touching the document tray 72. Thus, it is possible to suppress damaging of the document tray 72 by the user gripping the document tray 72 for rotating the ADF 7. It is noted that the right part 72A and the left part 72B of the document tray 72 may be arranged at the same position in the front-rear direction.

Figure 2:
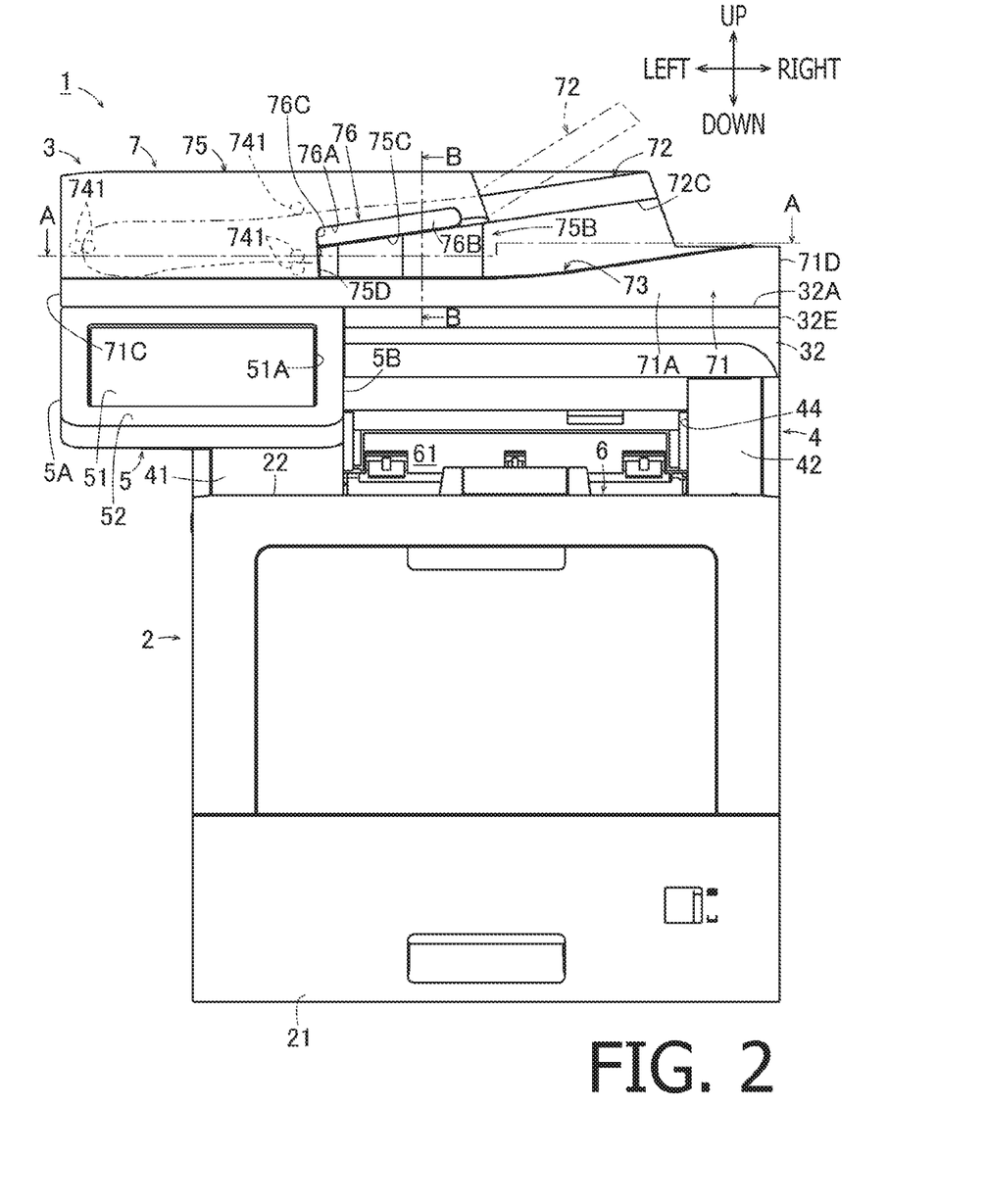
FIG. 2 is a front view of the image forming apparatus.
Figure 6:
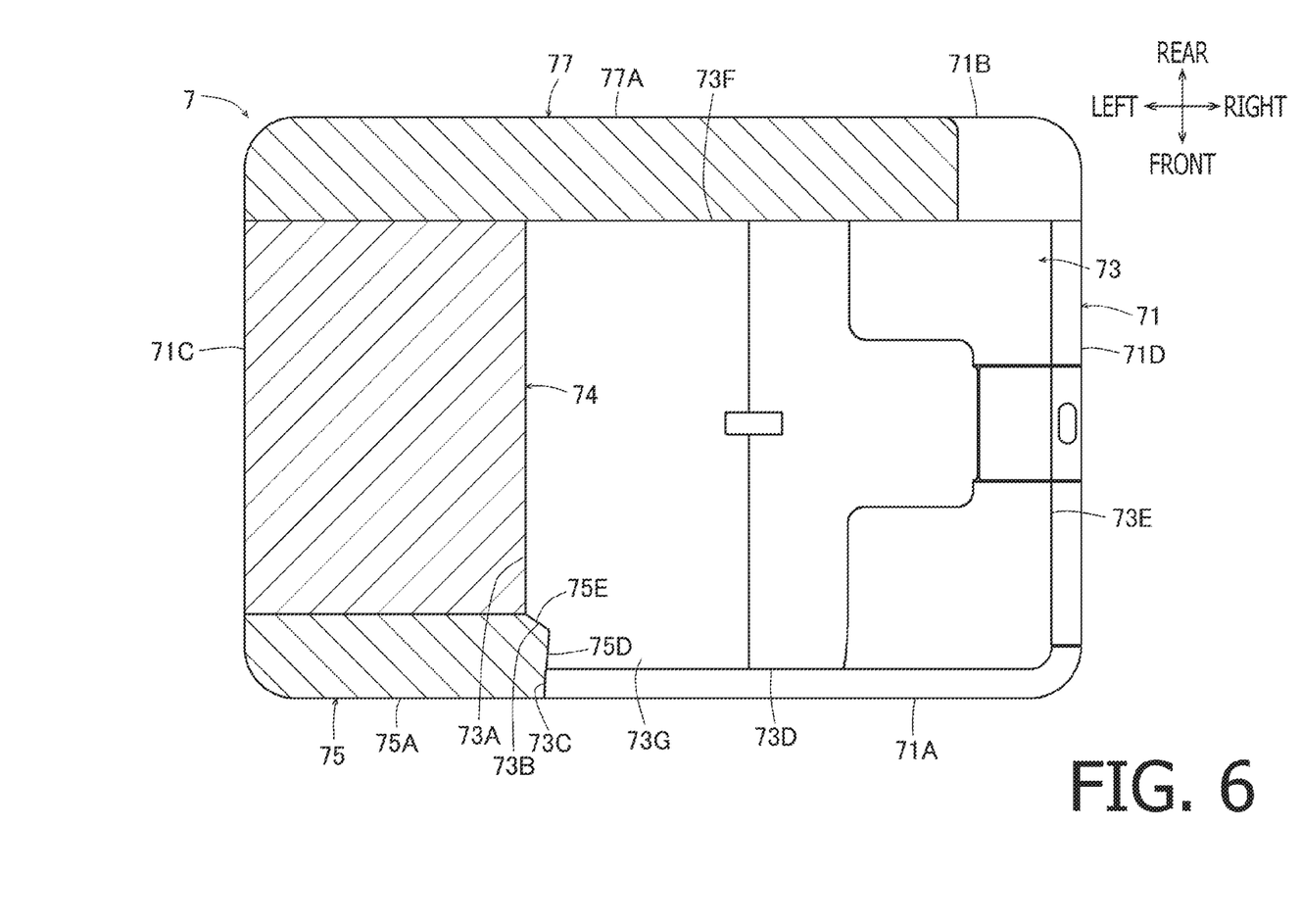
FIG. 6 is an enlarged schematic cross-sectional view taking at line A-A in FIG. 2.

The document discharge tray 73 is arranged below the document tray 72 with a space therebetween and is configured to support the document sheets having been scanned. The document discharge tray 73 according to the present disclosures is formed on a part of an upper surface of the document cover 71. FIG. 6 schematically shows an enlarged cross-sectional view taken along a line A-A in FIG. 2, and FIG. 7 schematically shows an enlarged cross-sectional view taking along a line B-B in FIG. 2.

As shown in FIG. 6, an outer periphery of the document discharge tray 73 includes a first left end part 73A, a first front end part 73B, a second end part 73C, a second front end part 73D, a right end part 73E, and a rear end part 73F. The left end part 73A extends in the front-rear direction along a right end of the conveyer 74. The front end part 73B extends in an obliquely frontward direction from a front end of the first left end part 73A toward the front wall 75.

The second left end part 73C extends frontward from a right end of the first front end part 73B along the front wall 75. The second front end part 73D extends rightward in parallel with the front surface 71A of the document cover 71 from a front end of the second left end part 73C. The right end part 73E extends rearward in parallel with the right surface 71D of the document cover 71 from a right end of the second front end part 73D. The rear end part 73F extends from a rear end of the right end part 73E to a rear end of the first left part end 73A along a front end of the rear wall 77.

Figure 7:
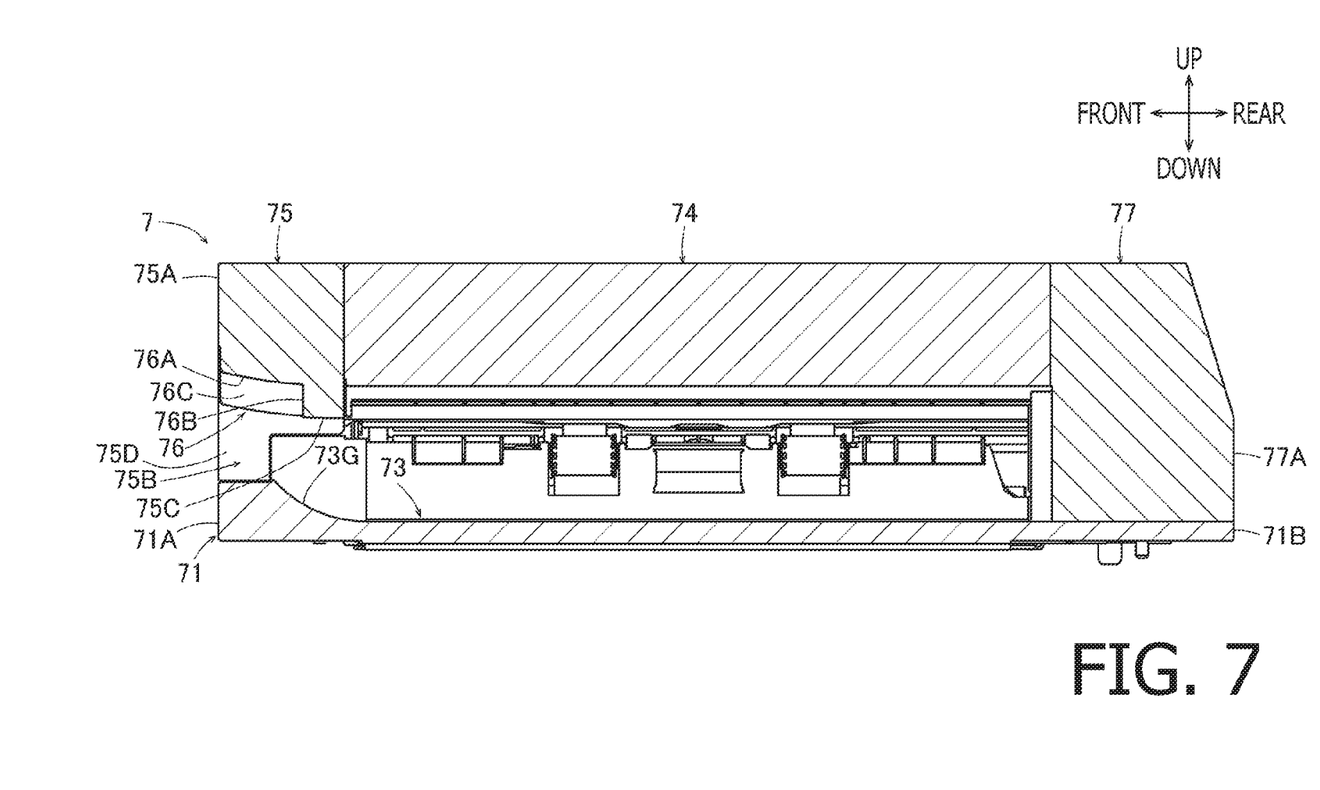
FIG. 7 is an enlarged schematic cross-sectional view taking at line B-B in FIG. 2.

As shown in FIG. 7, a front part 73G of the document discharge tray 73, which is arranged immediately below the hand grip 76, has an inclined surface that inclines upward toward a frontward direction. The inclined surface here may be a curved surface as shown in FIG. 7 or a planar surface. According to this configuration, it is possible to smoothly take out the document sheets from the document discharge tray 73 along the front part 73G. Further, by forming the front part 73G as the inclined surface and arranging the document discharge tray 73 at a lower position, a space, in the up-down direction, with respect to the hand grip 76 becomes large. Therefore, the user can grip the hand grip 76 easily.

As shown in FIG. 6, the conveyer 74 is arranged above the document cover 71 and between the front wall 75 and the rear wall 77. As shown in FIG. 2, the conveyer 74 includes a plurality of conveying rollers 41 and is configured to convey the document sheet from the document tray 72 to the document discharge tray 73. The document sheet is scanned by the image reader while being conveyed.

As shown in FIG. 6, the front wall 75 is fixed to an upper surface of the document cover 71 on a front side with respect to the document tray 72 and the conveyer 74. The front surface 75A of the front wall 75 and the front surface 71A of the document cover 71 are arranged on the same plane. As shown in FIG. 2, the front wall 75 includes a cutout part 75B configured to open a front part of a space above the document discharge tray 73 along the right-left direction.

The cutout part 75B is formed by an upper periphery 75C extending on the same plane on which a lower surface 72C of the document tray 72 located at the first position extends, and a left periphery 75D located on a right side with respect to a discharging opening of the conveyer 74 and extending in the up-down direction. As such, by forming the cutout part 75B on the front wall 75, it becomes easier for the user to visually recognize the document sheets and take out the same stacked on the document discharge tray 73.

As shown in FIG. 6, a rear surface 75E of the front wall 75, which is arranged in front of the first front end part 73B of the original discharge tray 73 and located between a left periphery 75D of the cutout part 75B and a right front end of the conveyer 74, is an inclined surface that inclines frontward toward the cutout part 75B. The inclined surface may be a planar surface elongated in a vertical direction as shown in FIG. 6 or a curved surface.

As described above, the rear surface 75E of the front wall 75 arranged in front of the original discharge tray 73 is inclined frontward which is a direction where the document sheets are taken out from the original discharge tray 73. According to this configuration, it is possible for the user to smoothly take out the document sheets from the original discharge tray 73 along the rear surface 75E.

As shown in FIG. 2, the hand grip 76 is provided to an upper periphery 75C of the cutout part 75B formed on the front wall 75 and is a part to be gripped by the user when the ADF 7 is lifted from the closed position toward the opened position. By providing the hand grip 76 to the upper periphery 75C of the cutout part 75B, the image forming apparatus 1 can be downsized. Further, it is possible to suppress the finger from being pinched between the document placing table 32 and the ADF 7, and the user can safely and easily operate the image forming apparatus 1.

As shown in FIG. 7, the hand grip 76 is configured by a recessed part formed from the front surface 75A of the front wall 75 to a lower surface (i.e., the upper periphery 75C). Since the hand grip 76 is configured by the recessed part, the user can visually recognize the hand grip 76 easily. Specifically, the recessed part of the hand grip 76 includes a lower surface 76A and a front surface 76B extending downward from a rear end of the lower surface 76A.

The lower surface 76A is an inclined surface which inclines downward toward rearward. The inclined surface may be a curved surface as shown in FIG. 7 or a planar surface. According to such a configuration, a space in front of the hand grip 76 is enlarged, and the user can easily insert his/her hand into the space and grip the hand grip 76. It is noted that, the lower surface 76A may be a horizontal surface (i.e., horizontally extending surface) instead of the inclined surface.

As shown in FIG. 2, the lower surface 76A of the hand grip 76 is an inclined surface which inclines upward toward the right side (i.e., toward a right direction from the conveyer 74 toward the original discharge tray 73). The inclined surface may be a planar surface as shown in FIG. 2 or a curved surface. According to this configuration, since a right side space of the hand grip 76 is enlarged, the user can easily insert his/her hand into the space and grip the hand grip 76. It is noted that the lower surface 76A may be a horizontal surface instead of the inclined surface.

As shown in FIG. 2, when viewed from a front side, a left end part 76C, which is a side end part on the conveyer 74 side of the hand grip 76, is positioned between, in the right-left direction, a right surface 5B, which is one side end of the operation panel 5, and a right end part 51A, which is one side end of the touch panel 51. According to this configuration, visibility of the touch panel 51 is not lost even when the user grips the hand grip 76. Further, since the hand grip 76 and the touch panel 51 are arranged closely to each other, it is easy for the user to continuously operate the hand grip 76 and the touch panel 51.

As shown in FIG. 2, when viewed from the front side, at least a part of the hand grip 76 is arranged to overlap, in the right-left direction, the sheet discharge tray 6. According to this configuration, since the hand grip 76 and the touch panel 51 become close to each other, it is easy for the user to continuously open/close the ADF 7 and take out the sheets from the sheet discharge tray 6.

As shown in FIG. 6, the rear wall 77 is fixed to an upper surface of the document cover 71 on a rear side with respect to the document tray 72 and the conveyer 74. The rear surface 77A of the rear wall 77 and the rear surface 71B of the document cover 71 are arranged on the same plane.

Although the document tray 72 is arranged above the original discharge tray 73 in the above described embodiment, the document tray 72 and the original discharge tray 73 may be arranged with their upper and lower arrangement positions are reversed. That is, the first tray may be the original discharge tray and the second tray may be the document tray.

The hand grip 76 is defined by the recessed part in the above described embodiment. Optionally or Alternatively, the hand grip 76 may be formed to have a texture surface and/or a color different from the colors of the other parts.

What is claimed is:

1. An image forming apparatus comprising:
an image reading device including:
a document placing table including an image reader configured to read an image of a document sheet placed on the document placing table; and
an auto document feeder rotatably supported by the document placing table such that the auto document feeder is rotatable between a closed position and an opened position, the auto document feeder covering an upper surface of the document placing table when located at the closed position, and the auto document feeder uncovering the upper surface of the document placing table when located at the opened position,
wherein the auto document feeder includes:
a first tray which is one of a document tray and a document discharge tray, the document tray being configured to support the document sheet before the image is read by the image reader, and the document discharge tray being configured to support the document sheet after the image is read by the image reader;
a second tray arranged below the first tray with a space between the first tray and the second tray, the second tray being the other of the document tray and the document discharge tray;
a conveyer configured to convey the document sheet from the document tray toward the document discharge tray;
a front wall arranged on a front side with respect to the first tray, the front wall being formed with a cutout part through which a front part of the space is opened along a width direction perpendicular to both an up-down direction and a front-rear direction, wherein the first tray is arranged entirely on a rearward side of the front wall in the front-rear direction; and
a hand grip arranged on an upper periphery of the cutout part of the front wall, the hand grip configured to be gripped by a user and lifted when the auto document feeder is rotated from the closed position toward the opened position;
an operation panel arranged on the same side as the conveyer in the width direction; and
a main body arranged below the document placing table, the main body including an image forming part configured to form an image on a sheet.

2. The image forming apparatus according to claim 1, wherein the first tray is the document tray, and
wherein the second tray is the document discharge tray.

3. The image forming apparatus according to claim 1, wherein the first tray is rotatable between a first position and a second position above the first position, and
wherein, a part of the first tray which does not overlap the front wall when viewed from a front side of the first tray is located on a rear side with respect to another part of the first tray which overlaps the front wall when viewed from the front side of the first tray.

4. The image forming apparatus according to claim 1, wherein a lower surface of the hand grip inclines downward toward a rear side in the front-rear direction.

5. The image forming apparatus according to claim 1, wherein the conveyer and the second tray are arranged at different positions in the width direction, and
wherein a lower surface of the hand grip inclines upward toward a direction from the conveyer to the second tray.

6. The image forming apparatus according to claim 1, wherein a front surface of the auto document feeder is arranged on a same plane as a front surface of the document placing table or inward with respect to the front surface of the document placing table.

7. The image forming apparatus according to claim 1, wherein both side surfaces of the auto document feeder in the front-rear direction are positioned in same planes as both side surfaces of the document placing table in the front-rear direction, respectively, or inward with respect to both side surfaces of the document placing table in the front-rear direction, respectively.

8. The image forming apparatus according to claim 1, wherein a part of the second tray, which is arranged immediately below the hand grip, inclines upward toward a front side in the front-rear direction.

9. The image forming apparatus according to claim 1, wherein a rear surface of the front wall, which is positioned on a front side with respect to the second tray and between the cutout part and the conveyer, inclines frontward toward the cutout part in the width direction.

10. An image forming apparatus according to claim 1, wherein the operation panel is arranged on a front side with respect to the conveyer and at a front end of the document placing table, the operation panel including a touch panel,
wherein the touch panel is arranged at a position different from a position of the hand grip in the width direction, and
wherein, when viewed from a front side of the front-rear direction, a side end part of the hand grip, on a side of the conveyer, is positioned between one of side ends of the operation panel and one of side ends of the touch panel in the width direction.

11. The image forming apparatus according to claim 1, further comprising a sheet discharge tray configured to support a sheet on which an image is formed by the image forming part,
wherein, when viewed from a front side in the front-rear direction, at least part of the hand grip is positioned to overlap the sheet discharge tray in the width direction.

12. The image forming apparatus according to claim 11, wherein, when viewed from the front side in the front-rear direction, the operation panel is arranged at a position different from the sheet discharge tray in the width direction.

13. The image forming apparatus according to claim 1, wherein the hand grip has a recessed part formed from a front surface to a lower surface of the front wall.

14. The image forming apparatus according to claim 1, wherein the hand grip is disposed between left and right surfaces of the front wall formed in the width direction.

15. The image forming apparatus according to claim 1, wherein the first tray has a cutout portion at a front-right side, the cutout portion not overlapping the front wall in the front-rear direction.

16. An image forming apparatus comprising:
an image reading device including:
  a document placing table including an image reader configured to read an image of a document sheet placed on the document placing table; and
  an auto document feeder rotatably supported by the document placing table such that the auto document feeder is rotatable between a closed position and an opened position, the auto document feeder covering an upper surface of the document placing table when located at the closed position, and the auto document feeder uncovering the upper surface of the document placing table when located at the opened position, the auto document feeder including:
    a first tray which is one of a document tray and a document discharge tray;
    a second tray arranged below the first tray with a space between the first tray and the second tray, the second tray being the other of the document tray and the document discharge tray;
    a conveyer configured to convey the document sheet from the document tray toward the document discharge tray;
    a front wall arranged on a front side with respect to the first tray, the front wall being formed with a cutout part through which a front part of the space is opened along a width direction perpendicular to both an up-down direction and a front-rear direction, wherein the front wall includes a recessed part on an upper periphery of the cutout part, and the first tray is arranged entirely on a rearward side of the front wall in the front-rear direction; and
    a hand grip arranged on an upper periphery of the cutout part of the front wall, the hand grip configured to be gripped by a user and lifted when the auto document feeder is rotated from the closed position toward the opened position;
an operation panel arranged on the same side as the conveyer in the width direction; and
a main body arranged below the document placing table, the main body including an image forming part configured to form an image on a sheet.

17. The image forming apparatus according to claim 16, wherein the recessed part includes an inclined surface which inclines downward toward a rear side in the front-rear direction.

18. The image forming apparatus according to claim 17, wherein the recessed part includes a front surface extending downward from a rear end of the inclined surface.

19. The image forming apparatus according to claim 16, wherein the first tray has a cutout portion at a front-right side, the cutout portion not overlapping the front wall in the front-rear direction.

* * * * *